United States Patent Office.

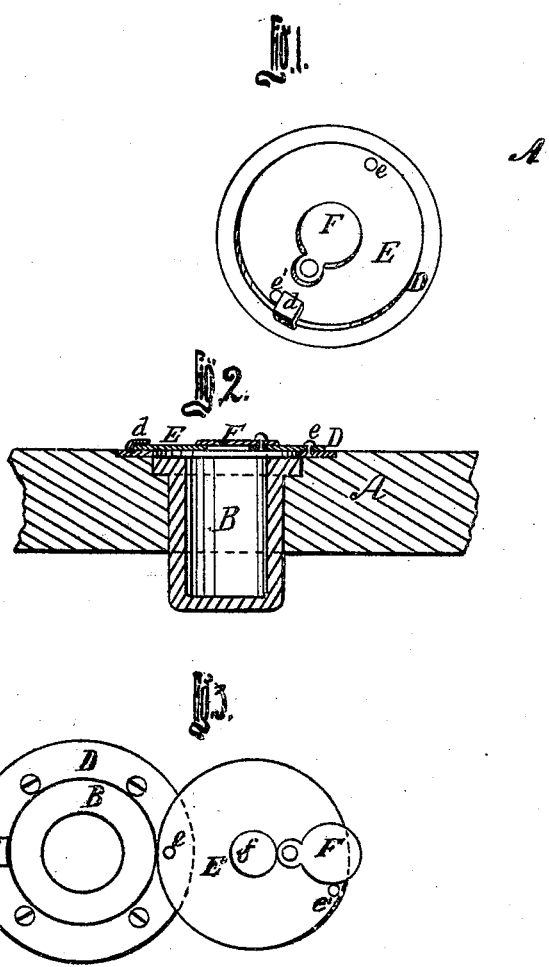

C. THURSTON CHASE, OF ALBANY, NEW YORK.

*Letters Patent No. 79,444, dated June 30, 1868.*

IMPROVEMENT IN INKSTANDS.

*The Schedule referred to in these Letters Patent and making part of the same.*

TO ALL WHOM IT MAY CONCERN:

Be it known that I, C. THURSTON CHASE, of the city and county of Albany, and State of New York, have invented a new and useful Improvement in Ink-Wells for School-Desks; and I do hereby declare the following to be a full, clear, and exact description of the same, sufficient to enable those skilled in the art to which the invention appertains to fully understand and use it, reference being had to the accompanying drawings, forming part of this specification, in which—

Figure 1 is a perspective view of my inkstand.

Figure 2 shows by a vertical section the insertion of the inkstand into the desk, and Figure 3 is a plan of the same, showing the cover turned to one side.

This invention consists of an improved ink-well, the arrangement of which is such that but a small opening is left for the ordinary purposes of dipping, over which a cap fits when not in use, but also so constructed that the whole cover is readily moved aside, when desired, for the purposes of filling or cleansing the well.

In the drawings, A represents a portion of the desk.

B, the cistern of the inkstand, with the rim resting in a countersink of the wood.

D represents a rim, circular in shape, and provided with suitable screw-holes for attachment to the desk, to which is pivoted the lid E.

Upon the opposite side of the rim to that to which the lid is attached is formed the catch $d$, which consists simply of a portion of the rim cut upon both sides, parallel with its diameter, to a point beyond the circle of the lid E when closed, which cut portion is punched up from the under side.

E represents the lid, pivoted at the point $e$, so as to rotate in a horizontal plane, and which is fastened securely in position, when closed, by the catch $c$. A stop, $e'$, prevents the lid from being pushed by the catch, and indicates the proper position of the former, when closed.

F represents a cap, attached at any suitable point to the lid E, and covering the dipping-hole $b$, when the inkstand is not in use.

If desired, the lid can be made inclined upon its edge, for the purpose of pressing it down upon the rim, or an interposed rubber ring, when the inclined portion comes in contact with the catch $e$, or the catch $e$ could be inclined in such manner as to force down the lid for the same purpose.

Among the advantages obtained by my invention are the more perfect protection of the ink from the air, ordinarily, and also the contracted opening when in use, the latter of which prevents the unsightly ink-spilling consequent upon the ordinary form of ink-wells.

Having thus described my invention, what I claim as new, and desire to secure by Letters Patent, is—

In combination with an ink-well, having a rim, D, and catch $d$, the pivoted cover E; when constructed, attached, and operated substantially in the manner and for the purposes specified.

C. THURSTON CHASE.

Witnesses:
 E. A. ELLSWORTH,
 NATHAN K. ELLSWORTH.